United States Patent [19]

Weir

[11] 4,118,019
[45] Oct. 3, 1978

[54] SHOCK ABSORBING PAD WITH KEYED STRUTS

[75] Inventor: David F. Weir, Sunnyvale, Calif.

[73] Assignee: Westinghouse Electric Corp., Pittsburgh, Pa.

[21] Appl. No.: 820,675

[22] Filed: Aug. 1, 1977

[51] Int. Cl.² .............................................. F16F 1/36
[52] U.S. Cl. .................................... 267/153; 248/24; 248/350; 267/63 R
[58] Field of Search ..................... 267/63 R, 141, 153, 267/80, 103, 105, 107; 5/361 B; 52/403; 293/88; 248/22, 24, 350, 358 R

[56] References Cited

U.S. PATENT DOCUMENTS

| 2,727,738 | 12/1955 | Lindley | 248/22 X |
| 3,191,896 | 6/1965 | Nathan | 267/153 X |

FOREIGN PATENT DOCUMENTS

| 592,661 | 5/1959 | Italy | 248/358 R |
| 487,346 | 6/1938 | United Kingdom | 248/358 R |

Primary Examiner—George E. A. Halvosa
Attorney, Agent, or Firm—F. J. Baehr, Jr.

[57] ABSTRACT

Struts of an elastomer shock absorbing pad are formed with notches and tongue-and-groove portions adjacent the notches to key the contacting surfaces of the pad struts together to prevent relative rotation and shear displacement under heavy shock loading.

6 Claims, 5 Drawing Figures

SHOCK ABSORBING PAD WITH KEYED STRUTS

BACKGROUND OF THE INVENTION

This invention relates to shock absorbing pads and more particularly to such pads with struts disposed between spaced-apart platforms.

Shock absorbing pads may be formed from elastomers, foamed material or platforms or plates spaced apart by struts or webs. The latter have the characteristic of being soft, that is, large deflections with light loads, as load is first applied and becoming harder, that is, small deflections under heavy loads, as load is continually applied. When it is desirable to produce a pad that is very soft when initially loaded and then becomes hard and is designed to absorb heavy loads there is a tendency for the platforms to rotate with respect to each other under high loads.

SUMMARY OF THE INVENTION

In general a shock absorbing pad, when made in accordance with this invention, comprises a first platform, a second platform disposed generally parallel to the first platform and a plurality of struts disposed between the platforms. The struts have notches disposed therein. The notches have tongue-and-groove portions spaced apart on opposing portions thereof, whereby the tongue-and-groove mate when shock loads are applied to one of the platforms absorbing the shock load without the platforms rotating with respect to one another.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 3:
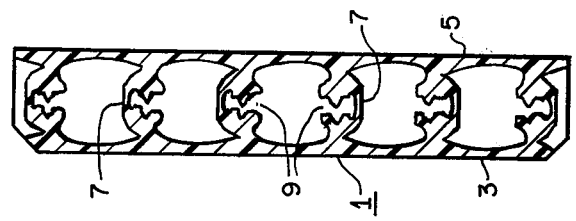
FIG. 3 is a sectional view taken on line III—III of FIG. 2.
Figure 1:
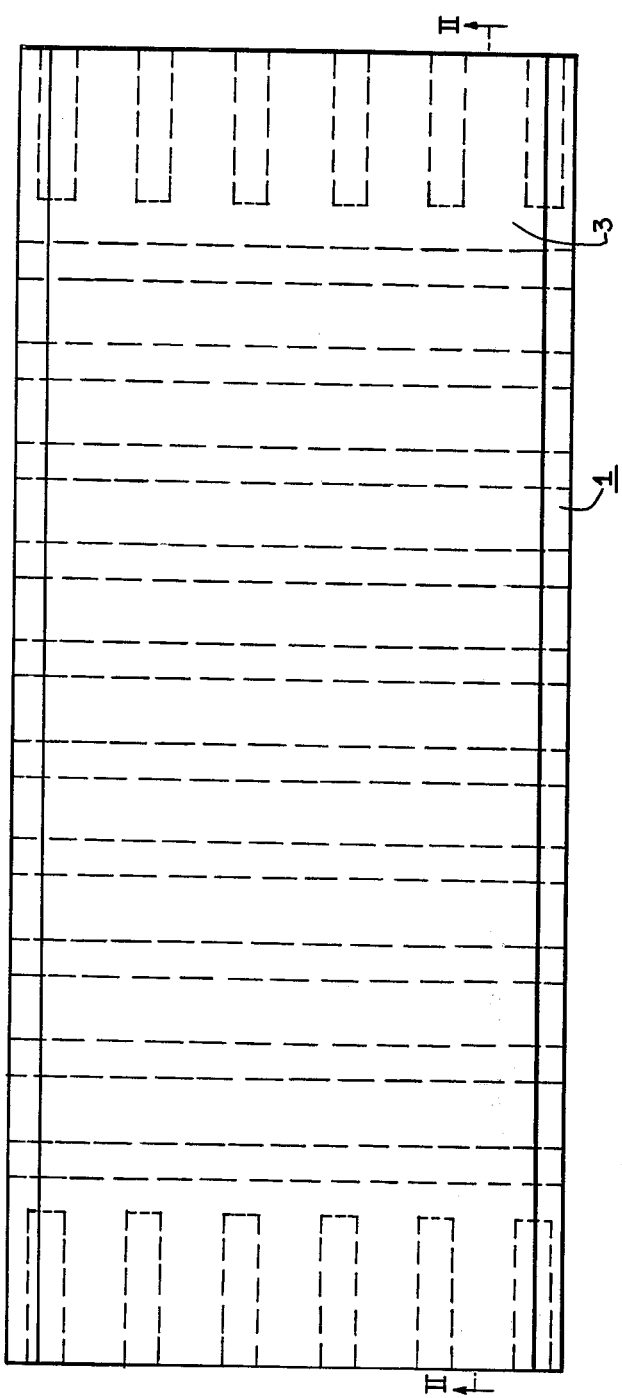
FIG. 1 is a plan view of a shock absorbing pad made in accordance with this invention.
Figure 2:
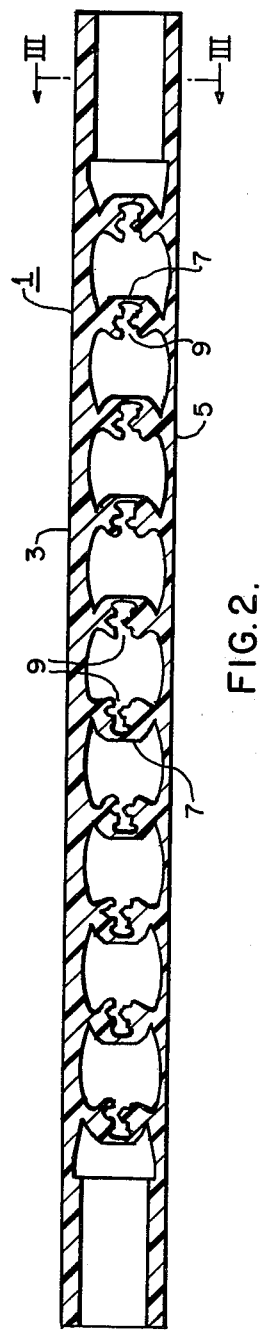
FIG. 2 is a sectinal view taken on line II—II of FIG. 1.
Figure 4:
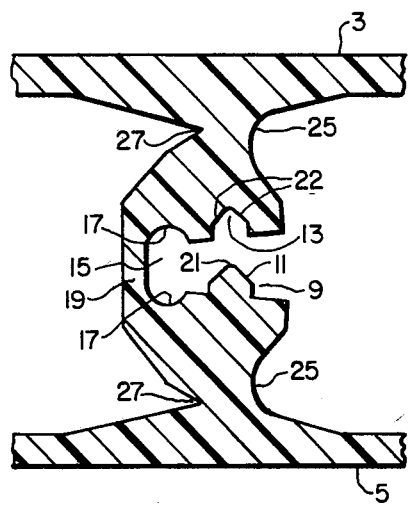
FIG. 4 is an enlarged partial sectional view showing the details of a strut.

Referring now to the drawings in detail there is shown a shock absorbing pad 1 comprising a first face sheet or platform 3, a second face sheet or platform 5 disposed generally parallel to the first platform 3 and a plurality of webs or struts 7 disposed between the platforms to space them apart.

The struts 7 have notches 9 centrally disposed to extend generally parallel to the platforms 3 and 5. The notches 9 have a tongue 11 and groove 13 portion spaced apart on opposing segments of the notch 9. The inner end of the notch 9 terminates in an oblong opening 15 with circular ends 17 disposed so that the inner end of the notch 9 has a short segment with generally parallel walls 19. The tongue 11 has its distal margins 21 chamfered and the groove 13 has tapered side walls 22 which register with the chamfer. The struts 7 are made with an enlarged central portion. On the side of the strut having the notch opening 9, the strut 7 tapers inwardly as it approaches the platforms and is joined to a tapered portion on the platform by a radius 25. On the side of the strut opposite the notch 9, the strut 7 tapers inwardly at two distinct rates and is joined to a tapered portion of the platform at a sharp corner 27. The tapers on the platform increase in thickness as they approach their juncture with the strut 7.

The pad 1 is generally rectangular with a plurality of struts 7 extending from margin to margin generally parallel to the short ends of the rectangular shaped pad. There are also a plurality of parallel short struts 7 extending inwardly from the outer margins of the short sides of the rectangular pads. One set of parallel struts is generally normal to the other sets of parallel struts. The short struts extend inwardly a distance slightly greater than the pitch between adjacent struts.

Figure 5:
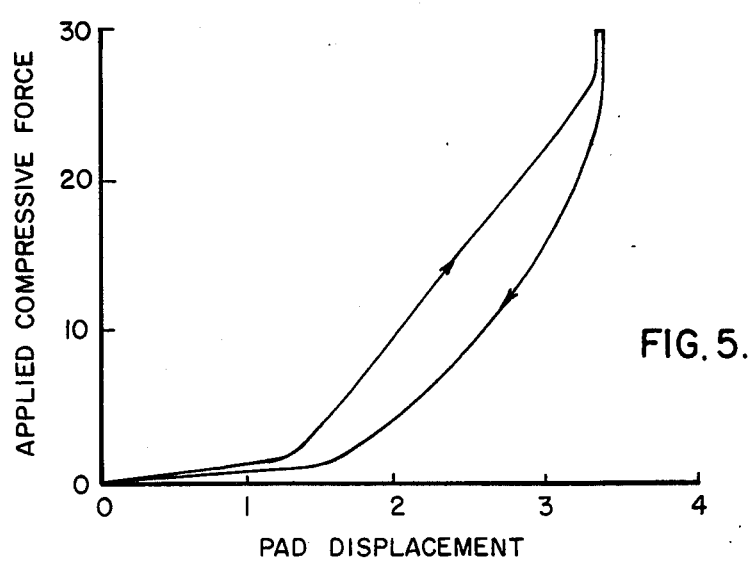
FIG. 5 is a curve showing displacement relative to force applied.

FIG. 5 shows how the pad acts under load. Initially there is a relatively large amount of deflection in response to a light load. During light loading the groove closes. Once the groove is closed the rate of deflection in response to incremental increase in load decreases and the interlocking tongue-and-groove prevent rotation and shear displacements of the platforms with respect to each other allowing the pad to absorb high shock loads without the platforms rotating with respect to each other (an undesirable condition which can reduce the load carrying capability of the pad).

The shock absorbing pad hereinbefore described advantageously has large deflections under light load and is very soft up to about 15% of its load carrying capacity then becomes substantially harder deflecting less under an incremental load increase for the remainder of its load carrying capacity and is able to remain stable even when subjected to high shock loads.

What is claimed is:

1. A shock absorbing pad having an elongated longitudinal section and comprising a first platform and a second platform disposed generally parallel to said first platform and extending along the length of said section, and a plurality of struts longitudinally spaced connecting said platforms and extending transverse to the longitudinal axis of said section, each of said struts having a notch opening in a direction facing an axis transverse to the longitudinal axis of said section, each said notch having only a single tongue-and-groove portion spaced apart on opposing portions of each said notch, the tongue-and-groove portions being disposed to mate when large shock loads are applied to one of said platforms to absorb said large shock loads without said platforms rotating with respect to one another.

2. A shock absorber as set forth in claim 1, wherein struts in a first section are disposed at a right angle with respect to other struts in another section.

3. A shock absorber as set forth in claim 1, wherein struts in a first section are disposed in parallel rows and struts in another section are disposed perpendicular to the first-mentioned rows of struts.

4. A shock absorber as set forth in claim 1, wherein the platforms have generally smooth outer surfaces.

5. A shock absorber as set forth in claim 1, wherein each strut has an enlarged central portion and the notch is disposed in the enlarged central portion of the strut.

6. A shock absorber as set forth in claim 1, wherein the tongue has its distal margins chamfered and the groove has sloping side walls which register with the chamfer when the tongue-and-groove portions mate.

* * * * *